May 6, 1969     E. B. DERR     3,442,057

OFFCENTER A-FRAME BUILDING STRUCTURE

Filed Sept. 29, 1967     Sheet _1_ of 2

INVENTOR.
Elmer B. Derr
BY John J. Kowacik
Atty.

May 6, 1969 E. B. DERR 3,442,057
OFFCENTER A-FRAME BUILDING STRUCTURE
Filed Sept. 29, 1967 Sheet 2 of 2
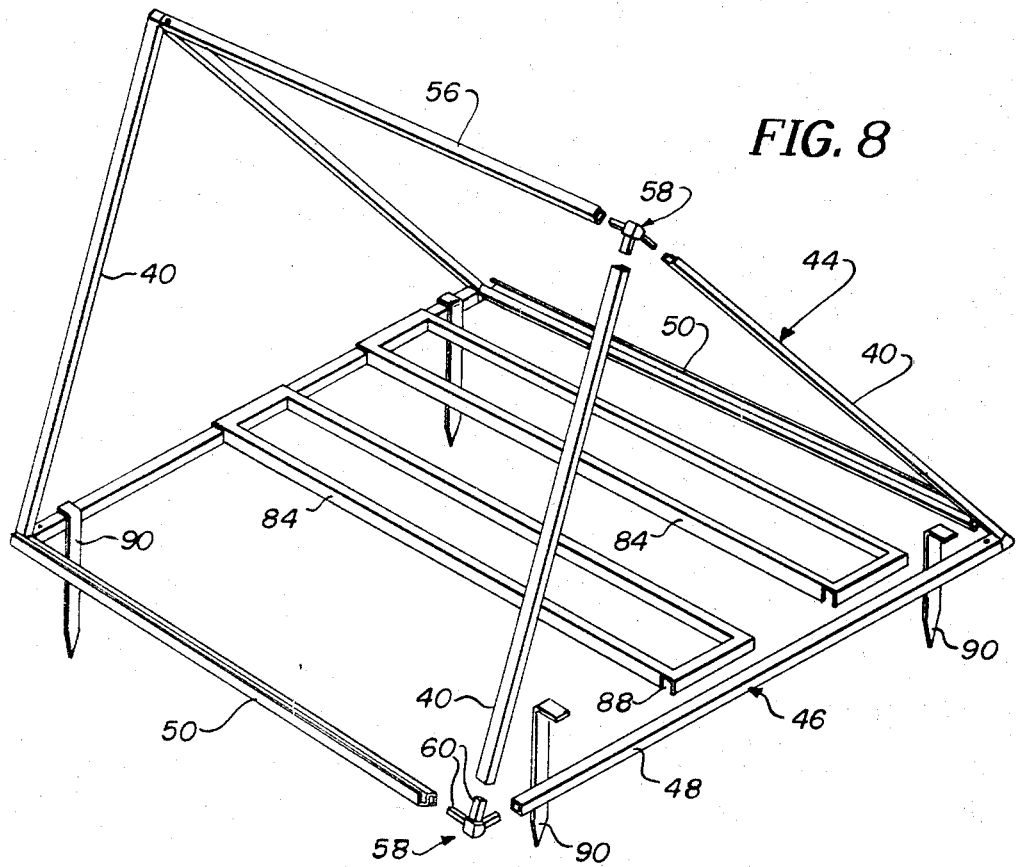
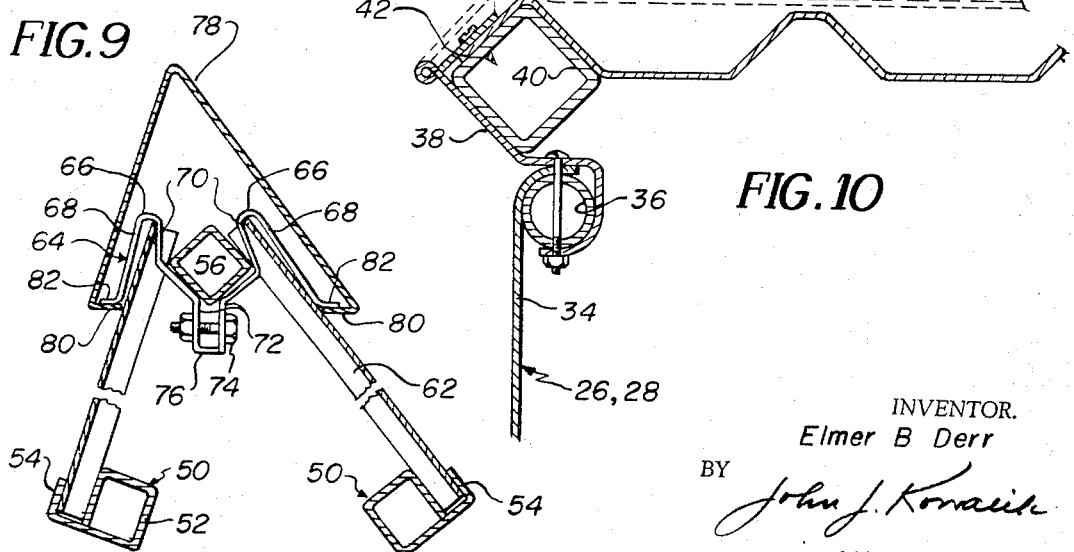
INVENTOR.
Elmer B Derr
BY John J. Kovacik
Atty.

United States Patent Office 3,442,057
Patented May 6, 1969

3,442,057
OFFCENTER A-FRAME BUILDING STRUCTURE
Elmer B. Derr, Stockton, Calif., assignor to International Harvester Company, Chicago, Ill., a corporation of Delaware
Filed Sept. 29, 1967, Ser. No. 671,670
Int. Cl. E04b *7/02, 1/00*
U.S. Cl. 52—90                                  7 Claims

ABSTRACT OF THE DISCLOSURE

Building structure of triangular shape, one side being more nearly vertical than the other, having doors at the ends, the doors on the more nearly vertical side being wider than the others providing greater opening to accommodate bigger pieces of equipment; doors are hinged on the inclined edges to swing abruptly upwardly from the horizontal ground edge to clear ground obstructions; includes a skeleton framework having separable pieces, and enclosure panels for enclosing the area within the building structure.

Background of the invention

The present invention relates to a small building structure which may be utilized for sheltering tools and small implements such as a garden tractor. The shelter is designed as a complete integrated and compact device which can be easily put together, and put in position in an area not necessarily designed for buildings, such for example as a backyard or other local and immediate area. The structure is triangular in shape for maximum strength.

Summary of the disclosure

The present invention relates to a small building structure, particularly adaptable to use at the home, or in other situations where a number of small instrumentalities are to be enclosed, such as at a home, or in an acreage, and which may accommodate for example a small tractor such as a garden tractor, and small tools, etc.

A broad object of the invention is to provide a building structure of the foregoing general character which is of triangular shape providing maximum strength for a given space and a given amount of materials.

Another object is to provide a structure of the foregoing character which utilizes a minimum of structural materials relative to a given enclosed space.

A further object is to provide a shelter structure of the kind referred to which, while of triangular shape, is nonsymmetrical, whereby to position one side nearer the vertical for accommodating larger instrumentalities, such as a garden tractor, while still providing additional space for accommodating other instrumentalities such as tools.

Still another object of the invention is to provide a building structure of the foregoing general character having inclined cover members, and doors mounted on the inclined members, in which the bottom edges of the doors, in closed position, lie along the ground, but which in opening movements, quickly and abruptly move away from the horizontal whereby to eliminate or minimize the requirement for removing obstructions from in front of the doors, such as snow piles or drifts.

Still another object is to provide a building structure of the foregoing general character in which the triangular construction includes one upright side closer to the vertical than the other side, and in which the doors closing the ends of the structure are divided so that one of them occupies a greater portion of the end area so that it may serve as a major door for accommodating a large implement such as a garden tractor.

Yet another object is to provide a structure of the foregoing general type which includes a skelton framework which is of simple construction and can be easily detachably put together, and which includes cover panels for providing the overhead enclosure, and in which novel means is provided for quickly detachably connecting the cover panels with the members of the skelton framework.

An additional object is to provide a structure of the general character referred to, including a skelton framework made up of detachable pieces, wherein the pieces are utilized in a novel manner to provide treadways for a vehicle to be enclosed.

*Description of a preferred embodiment of the invention*

FIGURE 8 is a perspective exploded view of the skeleton framework of the structure;

FIGURE 9 is a cross-sectional view of the principal portions of the skeleton framework, oriented according to line 9—9 of FIGURE 8; and FIGURE 10 is a cross-sectional view of the corner juncture of the construction such as represented by the line 10—10 of FIGURE 5.

Figure 1:
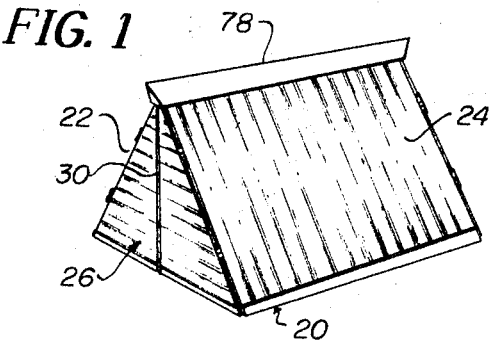
FIGURE 1 is a small scale representation of a building structure according to the present invention.

Referring now in detail to the accompanying drawings, attention is directed first to FIGURES 1 to 7 which show the shape and construction of the building structure of the invention in a general way, and representing the major features of the shape and proportions of the structure. The building structure is triangular in cross-section, having a base 20, two cover members 22 and 24, and end members indicated generally at 26 and 28. The end members 26 are made up of doors 26a and 26b, while the end member 28 is made up of doors 28a and 28b, these doors being non-symmetrical, but opposite in arrangement, i.e., the doors 26a and 28a being longitudinally aligned while the doors 26b and 28b are longitudinally aligned.

The doors at each end are parted by a line indicated at 30, this line being inclined substantially to the vertical, and not necessarily bisecting the angle between the sides 22, 24, and in fact is inclined more toward the longer sloping side 22.

Figure 2:
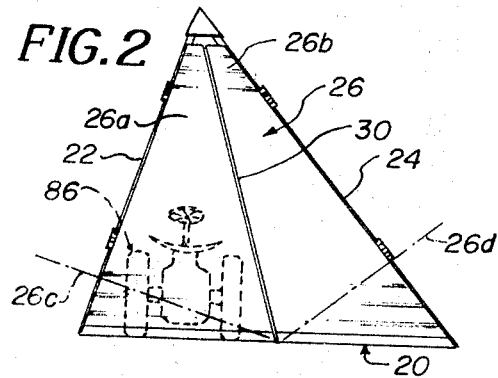
FIGURE 2 is a small scale end view of the structure.
Figure 3:
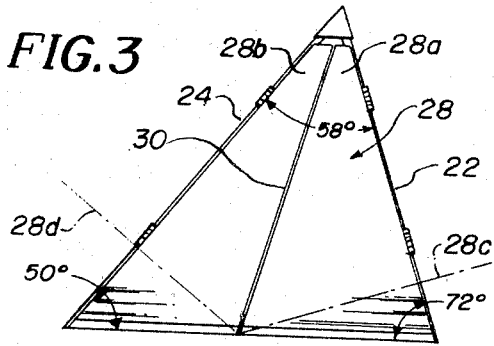
FIGURE 3 is a view from the end opposite that shown in FIGURE 2.
Figure 6:
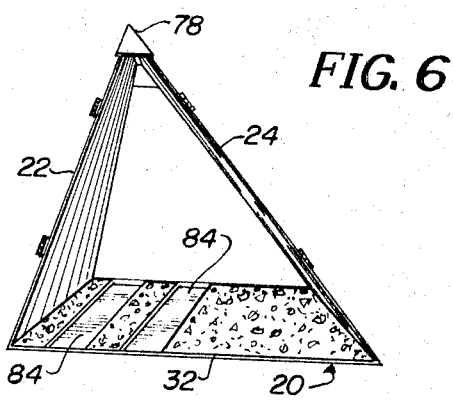
FIGURE 6 is a view of the structure, in open position, showing the treadways or tracks provided in the interior.

The dimensions and the proportions of the triangular shape of the structure is represented in FIGURES 2, 3 and 6. The base member of the structure, indicated at 32, of course lies flat on the supporting surface, such as the ground or a floor; the side 22 is closer to the vertical than the other side 24, and may be on the order of for example 72° to the horizontal; the other side 24 may be on the order for example of 50° to the horizontal; the apex, or the angle between the sides 22, 24 would thus be on the order of 58°. It is to be understood that these specific indications of dimensions are not to be regarded as limiting, but purely as examples to enable the beholder of the patent to conveniently perform the invention.

The parting line 30 between the doors extends to a position at the bottom in the neighborhood of the mid-point between the sides of the structure, but due to the overall shape of the structure, i.e., the different slopes to the cover members, the one door 28a is substantially wider than the door 28b as measured from its lowermost point on its swinging edge on a line perpendicular with its hinge edge, these lines being indicated 28c and 28d respectively.

The doors are mounted on the cover members by a construction shown in FIGURE 10. The door includes a panel member 34 having a frame member 36 which may be tubular, and a hinge element 38. The hinge element, when the door is in closed position as shown in full lines in FIGURE 10, lies against a frame member 40, and is pivotally connected in a hinge which includes another element 42 which is secured directly to the frame member. The hinge construction is so arranged that the door can swing between full closed position represented in full lines in FIGURE 10 and shown in FIGURES 1, 2 and 3, to a full open position shown in dotted lines in FIGURE 10, in which it lies flat against the cover member of the structure, the door moving through 270° from closed to open position.

FIGURE 8 shows the skeleton of the structure which is identified in its entirety at 44. This frame structure includes a base portion 46 which includes end pieces 48 and side pieces 50. The end pieces are preferably tubular and may be rectangular in cross-section, while the piece 50 each includes (FIGURE 9) a tubular portion 52 which may be rectangular in cross-section also and an extension 54 forming a generally upwardly opening channel. These pieces 50 are however disposed at an angle for receiving the panels of the cover members as referred to again hereinbelow. The top portion of the skeleton includes four frame members 40, one of which was identified above, at respective angles to the horizontal according to the slope of the cover members 22 and 24 as referred to above. Finally, the frame structure includes a top member or ridge piece 56, the pieces 40 and 56 also preferably being of tubular shape, and rectangular in cross-section. The pieces 48, 50, 40 and 56 are interconnected by connectors 58, which may be castings, at the junctures of the pieces and each having extensions or arms 60 which fit into the tubular pieces of the framework for securing them together. The friction established between these connectors and the structural pieces is sufficient to maintain the frame structure in assembled condition under normal circumstances, but the pieces may be disassembled when desired. Also, binding action is established between the connectors and the inclined pieces 40, which assists in retaining the skeleton assembled.

The cover members 22, 24 are formed by rigid panels 62 which may be corrugated, and are put in place by inserting the lower edges into the channels 54 and laying the upper ends against the ridge member 56 and are held in place on the latter by clamp means indicated generally at 64. The clamp means 64 are provided at desired spaced positions along the ridge member according to the length of the building, and each includes a pair of reverse bent straps or strips 66, each having a leg 68 fitted over the top edge of the panel and engaging the outer surface thereof. It also includes an inner leg 70 fitted to an under surface of the ridge member, the latter being disposed in diagonal position, and having a downwardly extending terminal piece 72, with means such as a bolt and nut 74 securing them together. If desired one of the extensions 72 may have a turned over piece 76, engaging the other one for spacing those two extensions apart. The clamp means 64 secures the cover member panels 62 solidly in position, the various forces involved being so directed as to provide a mutual binding effect, particularly because of the inclined relation of the elements, to resist separation of the parts.

A ridge cap 78 of generally inverted V-shape covers the otherwise partially open or "raw" top edge of the structure, having inturned lower extremities 80 which are engaged on the upper side by toes 82 formed on the ends of the outer legs 68 of the clamp means, the ridge cap thereby being held securely in position.

Figure 7:
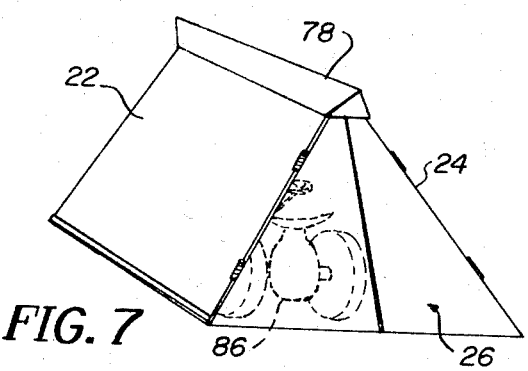
FIGURE 7 is a perspective view with the doors open, and an implement positioned therein.
Figure 4:
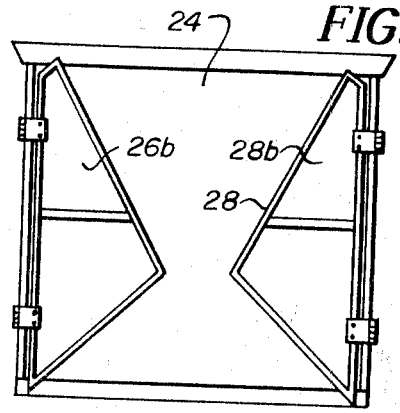
FIGURE 4 is a side view of the structure showing the door members related to that side, in open position.
Figure 5:
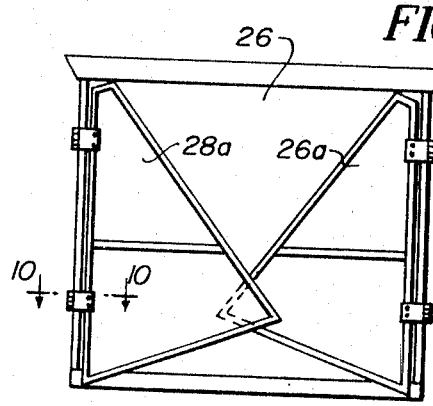
FIGURE 5 is a side view, opposite that shown in FIGURE 4, showing the door members on that side in open position.

Treadways 84 are preferably provided, which may serve the dual purpose of rigidifying the frame structure and preventing separation of the parts thereof, and forming tracks for an implement such as a tractor 86 shown in FIGURES 2 and 7. Each of these treadway members preferably is of rectangular outline, and each element thereof may be of channel shape opening downwardly. The end portions are provided with side notches 88 for receiving the end pieces 48, the treadway members being fitted downwardly over those end pieces and thus securing the latter against separation and assisting in securing the entire frame structure against separation. Finally, stakes 90 may be provided, having turned over top elements for engaging the upper surface of the end pieces 48, and upon being driven into the ground in such position, secure the entire structure firmly in position against displacement from and along the ground.

The doors 28, as noted above, include panels 34, and these panels may be of corrugated metal, such as the panels 62, or of any other desired structure.

The treadway members 84 are preferably positioned in line with the door 28a. Due to the shape of the door 28a, as determined by the parting lines 30, this door covers a substantially greater area than the other door 28b, and because of that, an opening of substantial dimensions is provided when that one door is open. Thus an implement such as a garden tractor 86 may be run into the building structure with only the one door open. The treadway members 84 may if desired have bottom pieces. They may be positioned anywhere along the end pieces, transversely of the building structure according to immediate circumstances.

The building structure being of triangular form possesses all of the great strength provided by a triangular shape or construction. The cover members 22, 24, being in inclined position shed snow to a great extent and thereby damaging loads often occasioned by snowfalls are avoided. The disposition of the one cover member 22 closer to the vertical than the other cover member 24 provides a great advantage in that greater usable space is provided than would be provided in the case of a symmetrical, or isosceles triangularly shaped, structure, since the closer to the vertical that that cover member is, the greater will be the efficiency with respect to usable enclosed space. However, notwithstanding the fact that the one cover member is closer to the vertical, it is preferably not vertical, but inclined, and the structure despite the fact that that one cover member is closer to the vertical, possesses a high percentage of the strength, and other attributes, of a symmetrical triangularly shaped structure.

The space under the more inclined cover member 24 provides great advantage in utilization in that smaller instrumentalities, such as hand tools, garden tools, etc. may be stored in that space.

Another great advantage is the mounting of the doors on the inclined edges of the cover members. The lower edges of the doors lie close to the ground, in keeping with total closure of the ends. In an ordinary building structure, opening of the doors presents a serious problem when snow drifts against the doors, since the snow must be cleared from in front of the doors throughout the full sweep of the doors, but in the present instance since the doors are mounted on inclined edges as they are, the lower edges of the doors swing upwardly abruptly in their opening movements so that any drifted snow in front of the doors need be cleared away only in a very small area, and that area in which the doors move in the initial portion of the entire movement. Moreover, the doors assume a stable position, i.e., it is not necessary to provide door stops to prevent them from "creeping" closed, as is many times the case when they are mounted on vertical hinges; when they are fully open they rest against the inclined cover members and would not be moved out of those positions, short of a high cyclone.

Having doors at both ends is of course an advantage inin providing maximum accessibility to the interior of the structure, but the invention is not limited to such door arrangement, and is sufficiently broad to cover doors at only one end.

The structure is extremely simple; the device can be easily disassembled and knocked down and set up in another place.

I claim:
1. A rigid building comprising a base, a pair of inclined side members, one of which substantially more nearly vertically disposed than the other, converging upwardly into an apex and forming a triangular structure with the base, a pair of doors closing an end of the structure, each door having an inclined edge paralleling the adjacent side member, hinge means mounting each door at its inclined edge on the respective side member, said doors having a parting line substantially bisecting the apex and extending to substantially a midpoint of said base.

2. A building structure comprising a base, a ridge member, panels constituting cover members having their upper edges substantially meeting at the top at an acute angle at said ridge member and their lower edges engaging said base, the angle included between the base and panels at one side of the structure being greater than the corresponding angle on the other side of the structure, clamp means extending under the ridge member and releasably securing the panels to the ridge member, wherein the clamp means include separate and detached clamp members, each being generally of inverted V shape form, and being positioned over the top edge of the respective cover member and having an outer leg engaging the outer side of the cover member, and an inner leg engaging the ridge member on the underside thereof, and means releasably securing the clamp members together.

3. The structure set out in claim 2 wherein a ridge cap of generally inverted V shape disposed over the top juncture of the cover members, the ridge cap having inturned flanges along their lower edges, and the clamp means having out-turned toes engaging said flanges and operative for retaining the ridge cap in position.

4. The structure set out in claim 2 wherein said base includes perimeter members, side ones of the perimeter members including generally upwardly opening channel portions, said lower edges of said panels being disposed in said channel members.

5. The invention set out in claim 2 wherein the ridge member is disposed at least partially below the upper extremities of the cover members, the cover members at least at that location being inclined inwardly toward each other, the ridge member having downwardly converging inclined under surfaces, and the legs of each clamp member being inclined correspondingly to the respective cover member and under surface.

6. A triangular building structure comprising a self-sustained skeleton frame structure including perimeter frame elements surrounding a base area, and surrounding cover areas which with the base area surround an enclosure space, the frame structure also defining end areas and including a ridge member, the frame structure supporting panel means in the cover areas for forming a cover for the enclosure space, and supporting door means closing the end areas of the structure, and treadway means interconnecting opposed perimeter frame elements of the skeleton frame structure for rigidifying the frame structure and serving as treadways within the enclosed space for a vehicle traveling into or housed within the structure, said frame structure being more nearly vertical at one side than the other, and said treadways being closer to said one side and serving as a supplementary base for said structure to implement the support by said perimeter frame elements of the structure.

7. A building structure comprising a skeleton framework including pieces surrounding a base area and including end pieces and side pieces, a ridge piece, and upright pieces interconnecting the corners of the base pieces and the ridge piece, the frame structure thereby defining a triangular shape having a longitudinal axis, connectors releasably interconnecting the various pieces at their junctures each including a body and end arms extending into the pieces, panels of planar shape supported by and against the side pieces and ridge piece, and forming cover members of the structure, and together with the base forming a triangular shape and defining an enclosure having ends spaced apart along said longitudinal axis, each of the angles of the triangle being less that 90° and the angle included between the base and side pieces on one side of the structure being greater than the corresponding included angle on the other side of the structure, the triangular shape resisting separation of the connectors from the pieces in directions lying in the planes of the ends of the structure, clamp means securing the upper edges of the panels to the ridge piece and comprising separate and detached clamp members, each being of generally inverted V shape and being positioned over the top edge of the respective cover member and having an outer leg engaging the outer side of the cover member, and an inner leg engaging the ridge member on the underside thereof, and means releasably securing the clamp members together, the clamp means resisting separation of the ridge piece from the panels and separation of the panels from other pieces of the skeleton frame structure, and means in the base interconnecting the end pieces of the base and resisting separation of those end pieces in directions along said longitudinal axis.

References Cited
UNITED STATES PATENTS

| 1,192,654 | 7/1916 | Lyon | 52—463 |
| 1,260,391 | 3/1918 | Kane | 52—90 |
| 1,931,750 | 10/1933 | Blaski | 52—90 |
| 2,317,634 | 4/1943 | Olsen | 52—463 |
| 2,835,931 | 5/1958 | Sterkin | 52—70 |
| 3,114,377 | 12/1963 | Clement | 135—3 |
| 3,346,998 | 10/1967 | Nelson | 52—70 |

FOREIGN PATENTS

| 123,684 | 6/1929 | Austria. |
| 166,092 | 11/1949 | Austria. |

HENRY C. SUTHERLAND, *Primary Examiner.*

U.S. Cl. X.R.

49—366; 52—57, 143, 204, 264, 278, 463; 135—1